(12) United States Patent  
Barrette (10) Patent No.: US 8,684,390 B1
(45) Date of Patent: Apr. 1, 2014

(54) RETRACTABLE TOW STRAP APPARATUS

(71) Applicant: Hampton Products International Corporation, Foothill Ranch, CA (US)

(72) Inventor: Jeffrey N. Barrette, Brooklyn, CT (US)

(73) Assignee: Hampton Products International Corporation, Foothill Ranch, CA (US)

(*) Notice: Subject to any disclaimer, the term of this patent is extended or adjusted under 35 U.S.C. 154(b) by 0 days.

(21) Appl. No.: 13/792,618

(22) Filed: Mar. 11, 2013

(51) Int. Cl.
*B60D 1/18* (2006.01)

(52) U.S. Cl.
USPC ............. 280/480.1; 242/385.4; 242/382; 242/382.3; 242/378.1; 242/378.3; 242/370; 242/390

(58) Field of Classification Search
USPC ............. 280/480.1; 242/385.4, 382, 378.1, 242/378.3, 370, 390
See application file for complete search history.

(56) References Cited

U.S. PATENT DOCUMENTS

| | | | |
|---|---|---|---|
| 4,416,429 A * | 11/1983 | Jessamine | 242/388.1 |
| 6,092,826 A * | 7/2000 | Pingel et al. | 280/480.1 |
| 7,942,360 B2 | 5/2011 | Breeden | |
| 2005/0224624 A1 * | 10/2005 | Park | 242/385.4 |
| 2006/0027697 A1 * | 2/2006 | Gojanovic et al. | 242/388.1 |
| 2007/0152091 A1 * | 7/2007 | Campbell | 242/371 |
| 2008/0238037 A1 * | 10/2008 | McGinnis et al. | 280/480.1 |

* cited by examiner

*Primary Examiner* — Joseph M Rocca
*Assistant Examiner* — Marlon Arce
(74) *Attorney, Agent, or Firm* — Klein, O'Neil & Singh, LLP (57) ABSTRACT

A retractable tow strap apparatus includes a housing containing a spool operably connected to a crank on the exterior of the housing. A tow strap is wound around the spool, the ends of the strap extending through a pair of apertures on opposite sides of the housing. Unwinding the strap from the spool through the apertures rotates the spool in a first direction. The strap is retrieved onto the spool by rotating the spool in a second direction using the crank. Springs within the housing apply a braking force on the portion of the strap that is on the spool, whereby slack in the strap and resultant tangling may be minimized as the strap is wound and unwound from the spool. The strap is formed of a unitary webbing element that extends through the spool, thereby minimizing the application of tension forces directly to the spool during a towing operation.

14 Claims, 9 Drawing Sheets

RETRACTABLE TOW STRAP APPARATUS

CROSS-REFERENCE TO RELATED APPLICATION

Not applicable.

FEDERALLY SPONSORED RESEARCH OR DEVELOPMENT

Not applicable.

BACKGROUND

The present disclosure relates generally to a tow strap for towing a vehicle, and in particular, to a retractable tow strap for towing a vehicle.

Tow straps can be used to tow a wide variety of vehicles. Tow straps are often chosen because they offer a significant weight savings over other towing connectors, such as tow chains or tow bars. However, a loose tow strap can be difficult to store, especially when a relatively longer length tow strap is used. Most vehicles have limited storage space and motorists must weigh the use of that space for many purposes. While many motorists choose to use at least some of the available storage space for automobile emergency equipment, the ability to containerize the equipment or size of the container itself often plays a role in the decision, with preference being given to effective equipment that fits in smaller containers.

Self-retracting tow straps are known, but self-retracting mechanisms can be unreliable, rendering the tow strap inoperable when the strap is most needed. Tow straps that are not containerized suffer none of the malfunctions of the self-retracting straps, but are bulky and difficult to store efficiently. In an emergency situation, operability is critical; however, emergency situations tend to occur rarely. Accordingly, most tow straps will spend most of their time in storage somewhere in a motor vehicle. Thus, it is important that a tow strap store easily, but it is critical that the strap work when it is needed. Accordingly, it would be beneficial to provide a retractable tow strap apparatus that can overcome the aforementioned problems.

SUMMARY

The various embodiments of the present tow strap apparatus have several features, no single one of which is solely responsible for their desirable attributes. Without limiting the scope of the present embodiments, their more prominent features now will be discussed briefly. After considering this discussion, and particularly after reading the section entitled "Detailed Description," one will understand how the features of the present embodiments provide advantages over known tow strap devices, including reliable operation, convenient storage, and ease of use in both deploying the strap and recovering it for storage.

In accordance with an aspect of the present disclosure, a retractable tow strap apparatus or device includes a protective housing having first and second diametrically-opposed openings or slots, and containing a manually-rotatable spool on which is wound a tow strap having first and second ends that extend from the first and second housing slots, respectively. One end of the spool extends to the exterior of the housing, where it is fixed to a hand crank. The tow strap extends through the central portion of the spool and is fixed to it, so that unwinding the strap from the spool rotates the spool, and thus the crank, in a first direction, while rotating the spool in a second direction by means of the crank rewinds the strap onto the spool. The strap has a fully wound or retracted position on the spool in which each of the first and second ends extends a short distance from its respective slot, and a fully unwound or extended position in which approximately one-half the total length of the tow strap extends from each of the first and second slots. Thus, in its extended position, substantially the whole length of the strap is unwound from the spool and deployed from the housing.

The tow strap is deployed from its retracted position to its extended position by pulling on the first and second ends of the strap, thereby unwinding the strap and rotating the spool and the crank in the first direction. The strap is withdrawn from its extended position to its retracted position by manually turning the crank in the second direction, thereby rotating the spool in the second direction to rewind the strap onto the spool. Preferably and advantageously, the housing contains one or more resilient braking members that frictionally engage the strap with a braking force as the latter unwinds from and winds onto the spool. This braking force provides a slight tensioning to the strap as it is paid out from the spool, thereby preventing, or at least substantially limiting, inadvertent unwinding due to the weight of the towing hooks that are typically attached to each end of the strap. This tensioning also minimizes backlash and tangling that could result from excessively rapid recovery of the strap onto the spool.

DETAILED DESCRIPTION

The detailed description set forth below in connection with the appended drawings is intended as a description of embodiments of a tow strap apparatus provided in accordance with aspects of the present disclosure, and it is not intended to represent the only forms in which the present apparatus may be constructed or used. The description sets forth the features and the steps for using the tow strap apparatus of the present disclosure in connection with the illustrated embodiments. It is to be understood, however, that the same or equivalent functions and structures may be accomplished by different embodiments that are also intended to be encompassed within the spirit and scope of the disclosure. As denoted elsewhere herein, like element numbers are intended to indicate like or similar elements or features.

Figure 1:
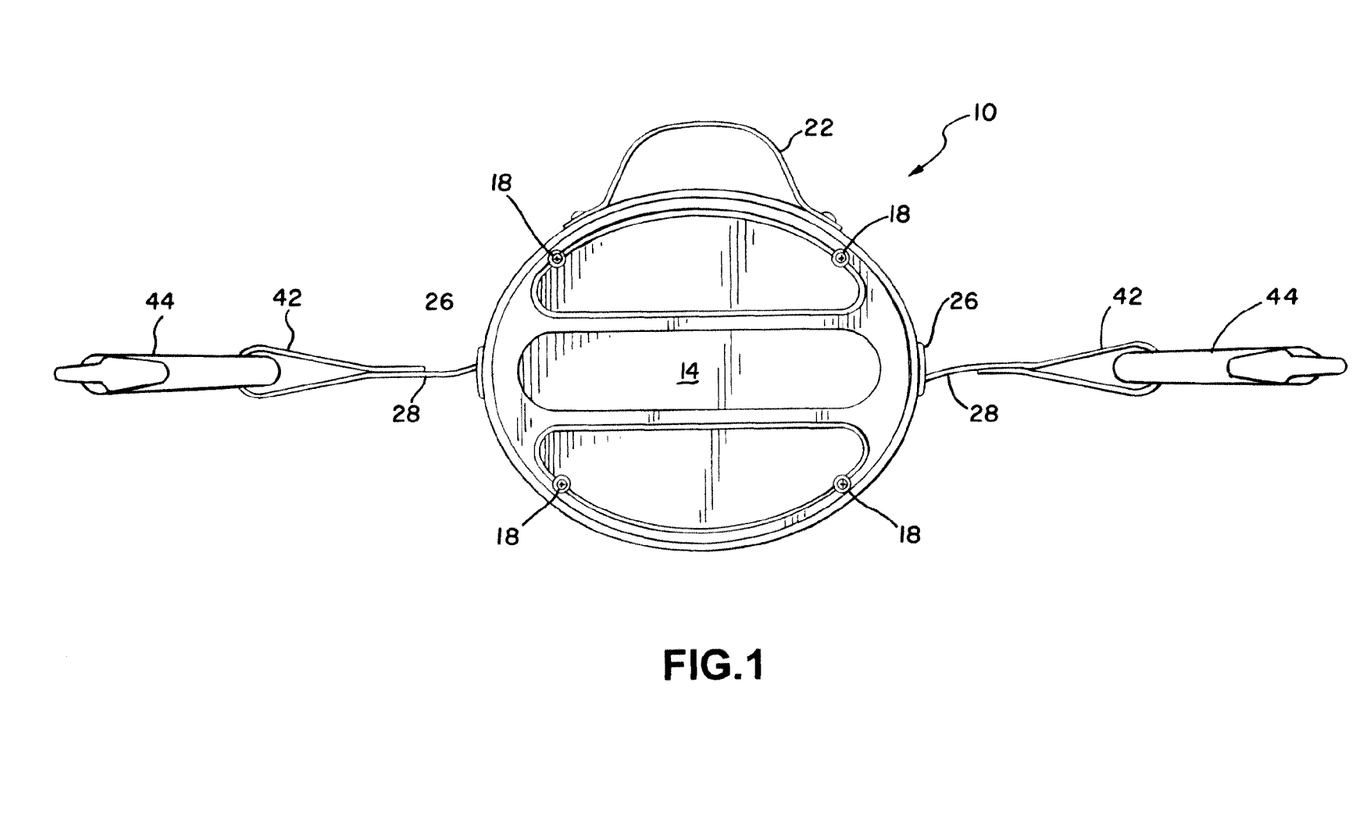
FIG. 1 is a back side elevation view of tow strap apparatus in accordance with an embodiment of this disclosure, showing the tow strap in a retracted position.
Figure 2:
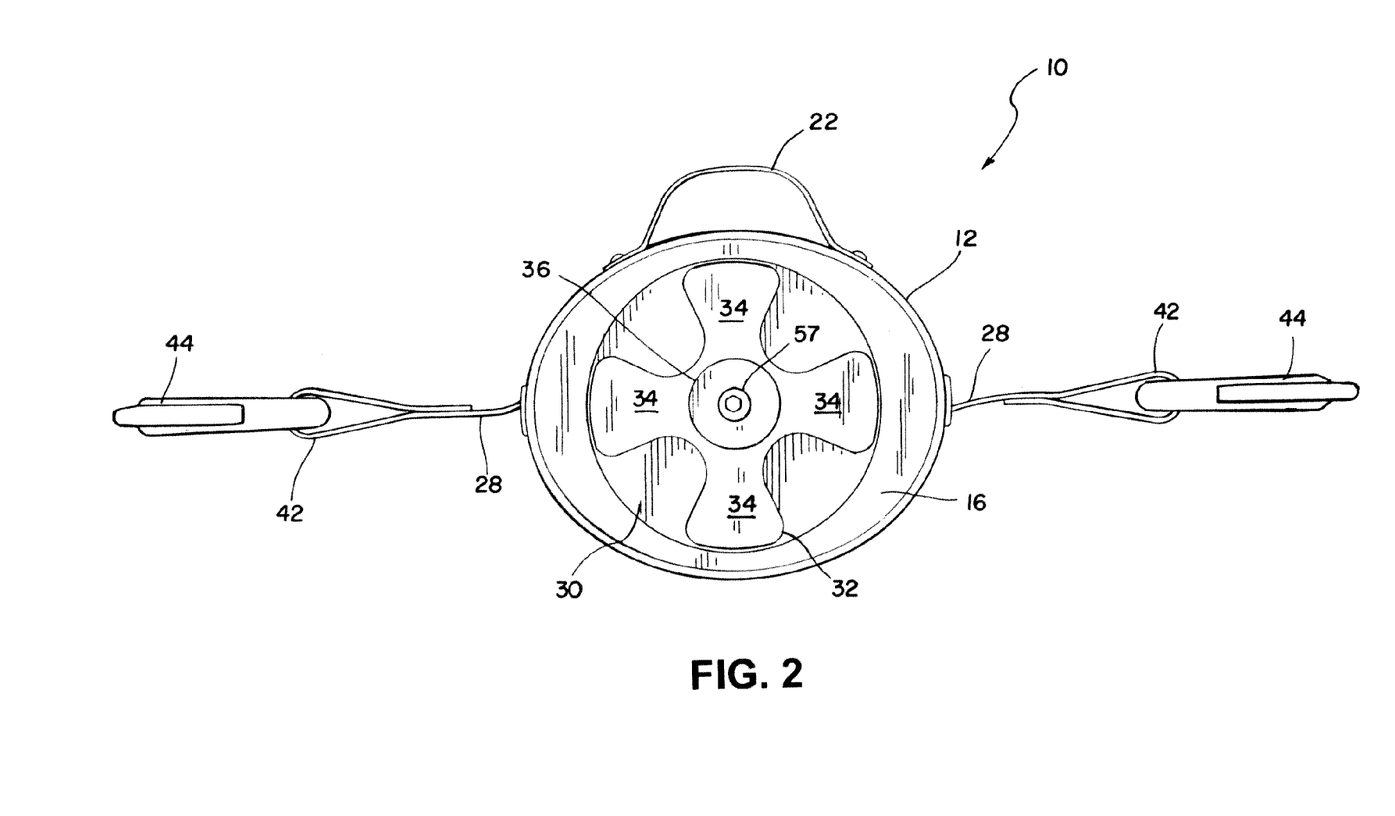
FIG. 2 is a front side elevation view of the tow strap apparatus of FIG. 1.
Figure 3:
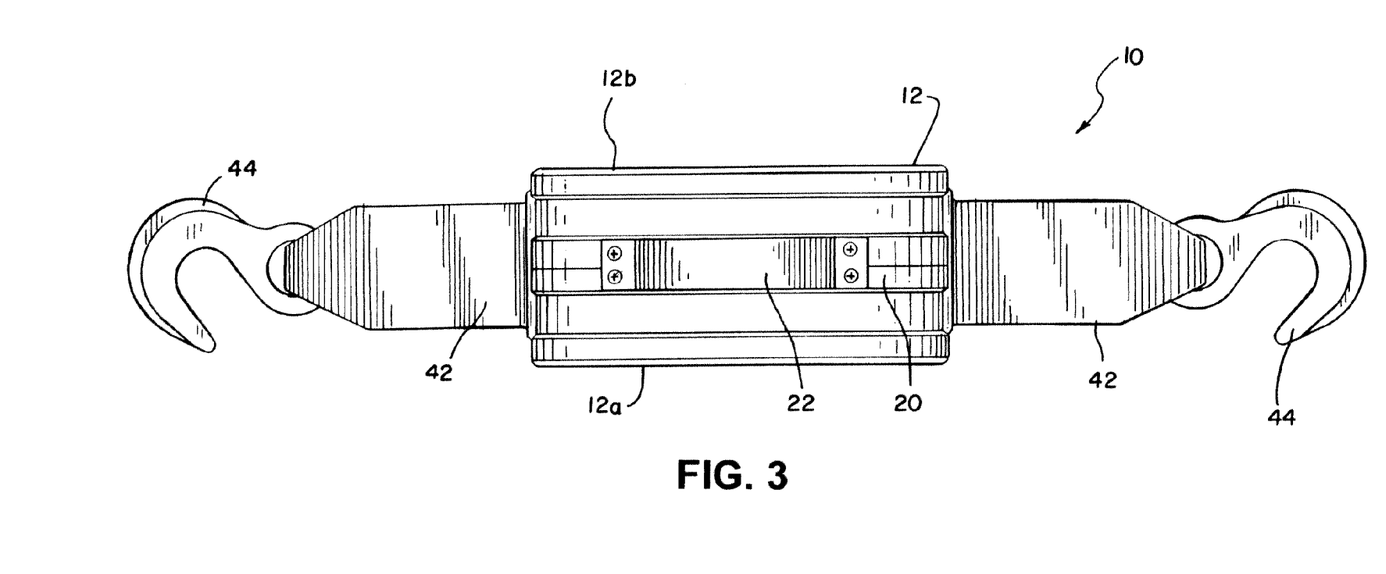
FIG. 3 is a top plan view of the tow strap apparatus if FIG. 1.

Referring first to FIGS. 1-5, an embodiment of a tow strap apparatus 10 in accordance with this disclosure is shown. The apparatus 10 includes a housing 12 that may advantageously comprise a first half 12a defining a first side wall 14 (FIG. 1) and a second half 12b defining a second side wall 16 (FIG. 2). The housing halves 12a, 12b are secured together at their peripheries by fastening elements, such as screws 18, for ease of construction and repair. Other fastening means, such as thermo-welding, sonic welding, adhesives, or snap fasteners, may be used. The house 12 may be made from a rigid and durable material, such as a metal or a molded polymeric material. Although the house 12 is shown with a configuration defining an elliptical perimeter, this configuration is exemplary only, and other configurations, such as circular, square, or polygonal may be used.

Figure 4:
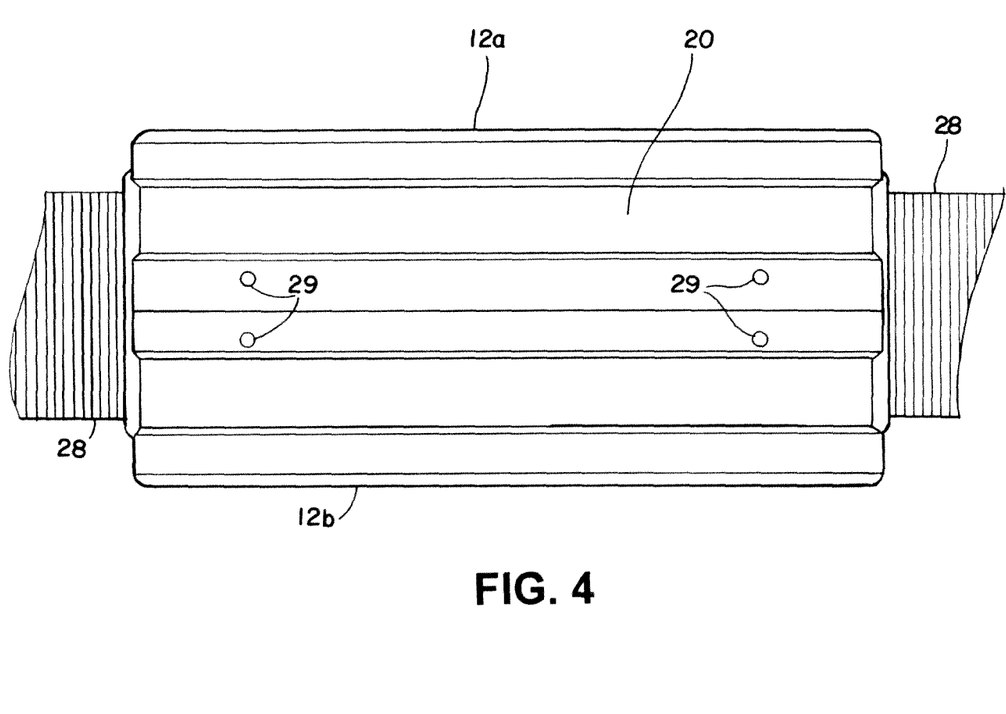
FIG. 4 is a bottom plan view of the housing of the tow strap apparatus of FIG. 1.

The housing 12 defines a peripheral wall 20 having a top area to which a carrying handle 22 is fixed. The peripheral wall 20 is further configured with first and second opposed end areas, each of which defines an elongated aperture or slot 26. As will be further described below, the opposed slots 26 accommodate a tow strap 28. As shown in FIG. 4, the peripheral wall 20 has a bottom area that may advantageously be provided with a plurality of drainage holes 29 that allow the drainage of moisture from the interior of the housing 12 that may accumulate therein from water on the strap 28.

As shown in FIG. 2, the second side wall 16 of the second housing half 12b defines a substantially circular recess 30 that accommodates a hand crank 32. Preferably, the recess 30 is deep enough so that the crank 32 is either flush with, or slightly recessed from, the portion of the second side wall 16 surrounding the recess 30. The crank 32 is shown with four gripping lobes 34 radiating from a central hub 36, but the lobes 34 may be from two to five in number, with the number and configuration of the lobes 34 depending on design and operational considerations. As will be discussed below, the hub 36 is fixed to one end of a spool 38 that extends through an aperture 40 (see, e.g. FIG. 5) in the second side wall 16.

The tow strap 28 comprises a single, unitary length of webbing, preferably of a high tensile-strength, stretch-resistant polymer such as nylon or polyester, having first and second looped ends 42, each of which is secured, by conventional means, to a tow strap attachment implement, such as a tow hook 44. The total length of the strap 28 may be from about 5 feet (1.5 m) to about 20 feet (6 m), or even more, depending on the application. The strap 28 should be strong enough to tow a vehicle. Each of the looped ends 42 extends from one of the slots 26, the latter being narrow enough to prohibit withdrawal of the looped ends 42 into the interior of the housing 12. The slots 26, through which the tow strap 28 passes, may advantageously have rounded edges to minimize frictional wear on the tow strap 28 as it passes through the slots 26 during extension and retraction, as will be described below.

Referring now to FIGS. 5-11, first and second circular walls or flanges 50, 52 are attached to first and second ends, respectively, of the spool 38 so as to be rotatable with the spool 38. A nub 54 is fixed to the side of the second flange 52 opposite the spool 38 and is disposed coaxially with the spool 38. The nub 54 extends through the aperture 40 in the second side wall 16, and it is configured to fit into a socket 55 on the hack side of the huh 36 of the crank 32. The nub 54 of the spool 38 may advantageously be provided with a threaded aperture 59 (FIG. 8), or, alternatively, a through-bore (not shown) to accommodate a threaded fastener 57, such as a screw (a self-tapping screw, if a through-bore is provided), to secure the crank 32 to the nub 54. The nub 54 and the socket 55 are preferably non-circular in shape, to minimize relative rotational movement between the crank 32 and the spool 38, so that the crank 32 and the spool 38 are rotatable as a unit. Advantageously, the aperture 40 in the second side wall 16 of the housing 12 may have an inwardly-extending peripheral rim 56, and the nub 54 may have a maximum dimension just slightly smaller than the diameter of the aperture 40, so that the peripheral rim 56 of the aperture 40 provides a bearing surface for the nub 54, thereby minimizing slackness or "play" between the nub 54 and the aperture 40. The end of the spool 38 to which the first flange 50 is attached advantageously extends through a central flange aperture 58 and is configured to seat rotatably in a socket (not shown) on the inner surface of the first side wall 14 of the housing 12.

The spool 38 is split into two semi-cylindrical axial segments by a diametric slot 60 configured for the passage of the strap 28 through it. The spool 38 is preferably situated within the housing 12 so that the spool 38 has rotational positions in which the slot 60 of the spool 38 may be in substantial alignment with the slots 26 of the housing 12. Thus, the strap 28 passes through one of the housing slots 26, through the shaft slot 60, and then through the opposite housing slot 26. This arrangement allows the unitary strap 28 to be wound or coiled on the spool 38 in a retracted position or state, such that when the strap 28 is deployed to its extended position or state by unwinding it from the spool 38, the spool 38 is rotated in a first direction, along with the crank 32 that is attached to it, as described above. When the spool 38 is rotated in the opposite (second) direction by turning the crank 32 in the second direction, the strap 28 is retrieved through the housing slots 26 and re-wound back onto the spool 38 to its retracted position or state. The length of the spool 38 between the flanges 50, 52 is advantageously slightly greater than the width of the strap 28, so that the strap 28 may stay in alignment with the side slots 26 of the housing 12.

As shown in FIGS. 6-11, the outer surface of the spool 38 may advantageously be configured with a plurality of longitudinal ridges 62 spaced around the circumference of the spool 38, to provide an improved frictional grip between the spool 38 and the initial windings of the strap 28. Also as shown in these drawing figures, the diametric slot 60 in the spool 38 may advantageously be provided with an array of gripping protuberances or teeth 64 on each side of the spool slot 60. These protuberances or teeth 64 grip the strap 28, so that the house 12 cannot easily be moved from its normal position in the approximate center of the strap 28. Centering of the housing 12 with respect to the length of the strap 28 assures that the strap 28 is consistently wound evenly on the spool 38, with approximately one-half the length of the strap 28 being consistently available to be extended from, and retrieved by, the spool 38 through each of the housing slots 26.

Figure 5:
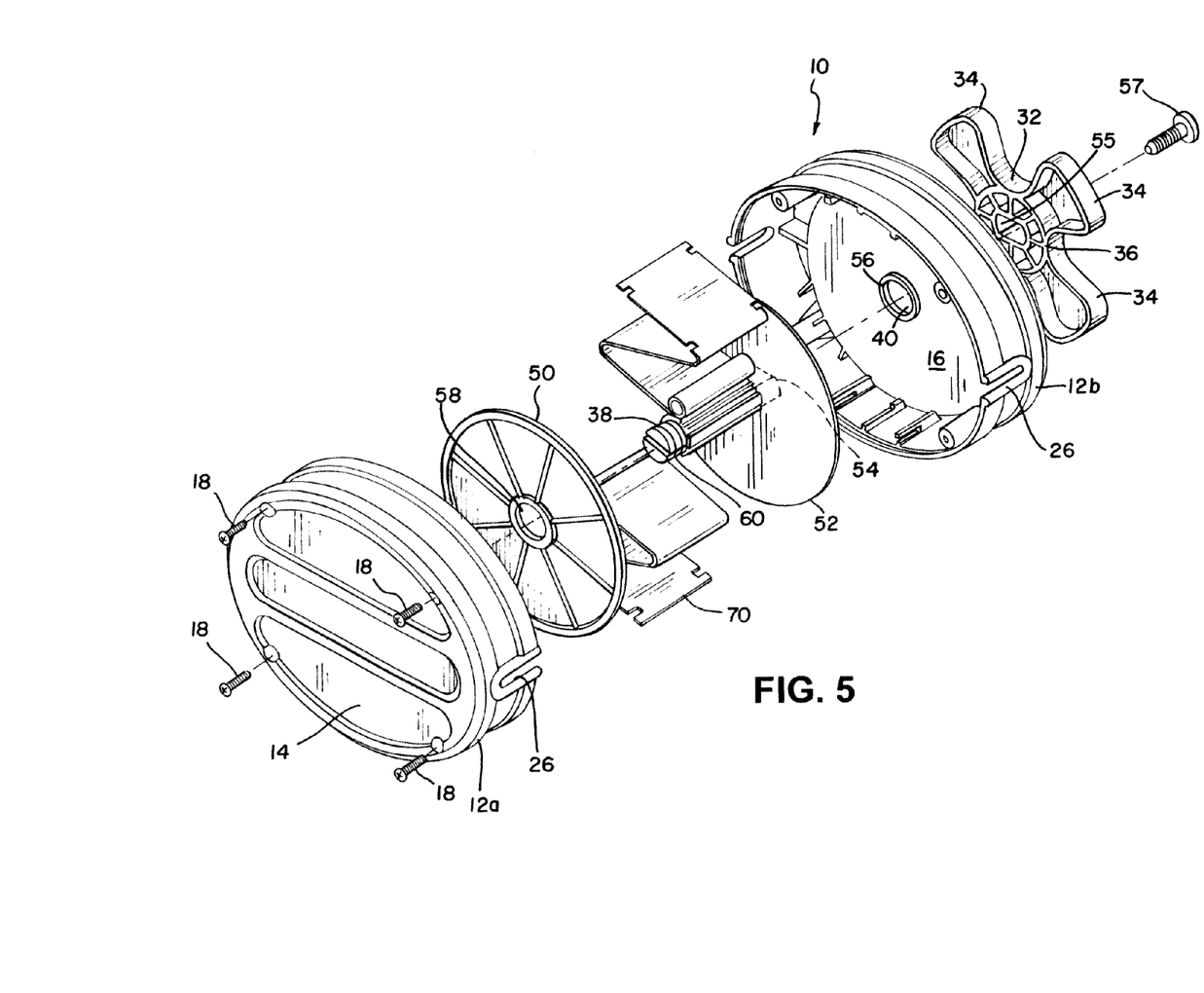
FIG. 5 is an exploded perspective view of the tow strap apparatus of FIG. 1, with the strap and carrying handle removed for clarity.
Figure 6:
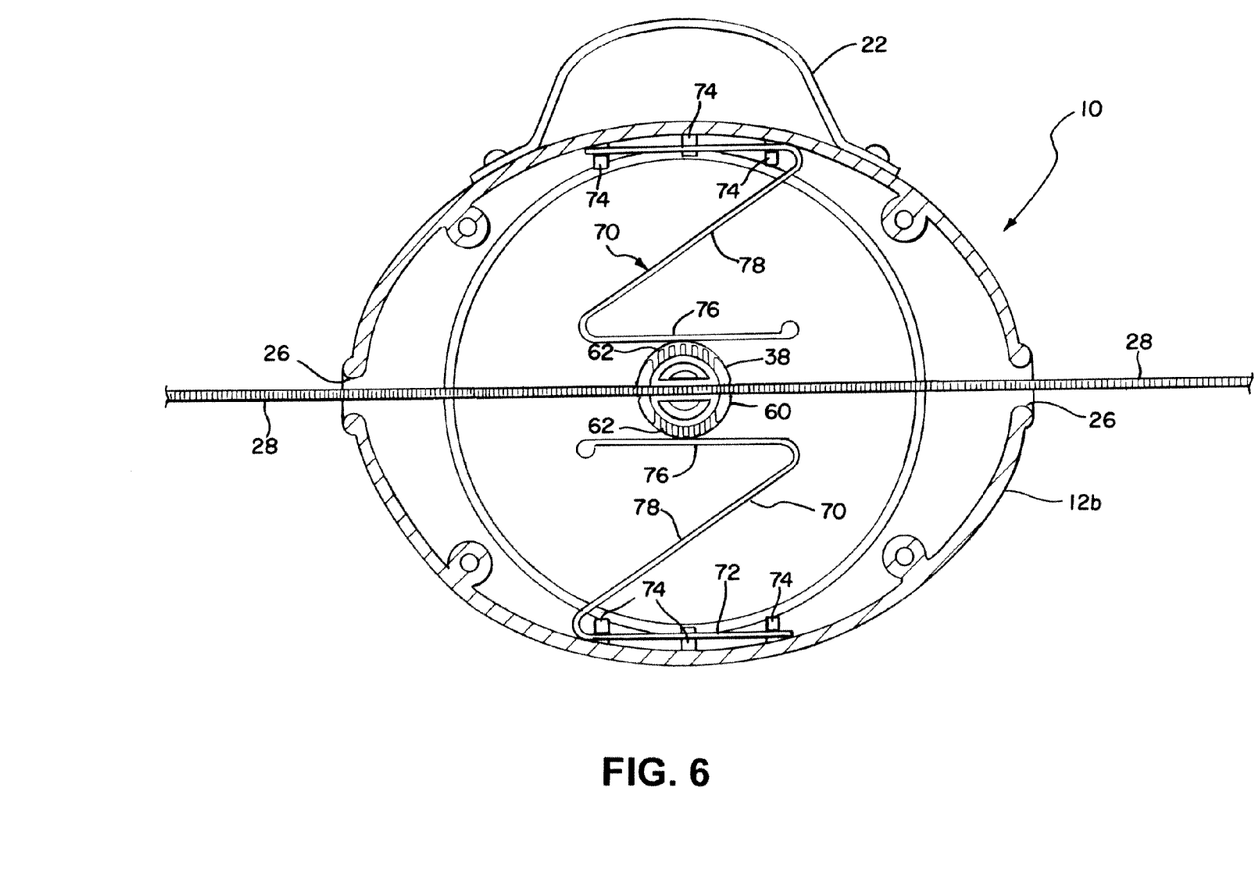
FIG. 6 is a cross-sectional view of the tow strap apparatus of FIG. 1, showing the strap in an extended position.
Figure 7:
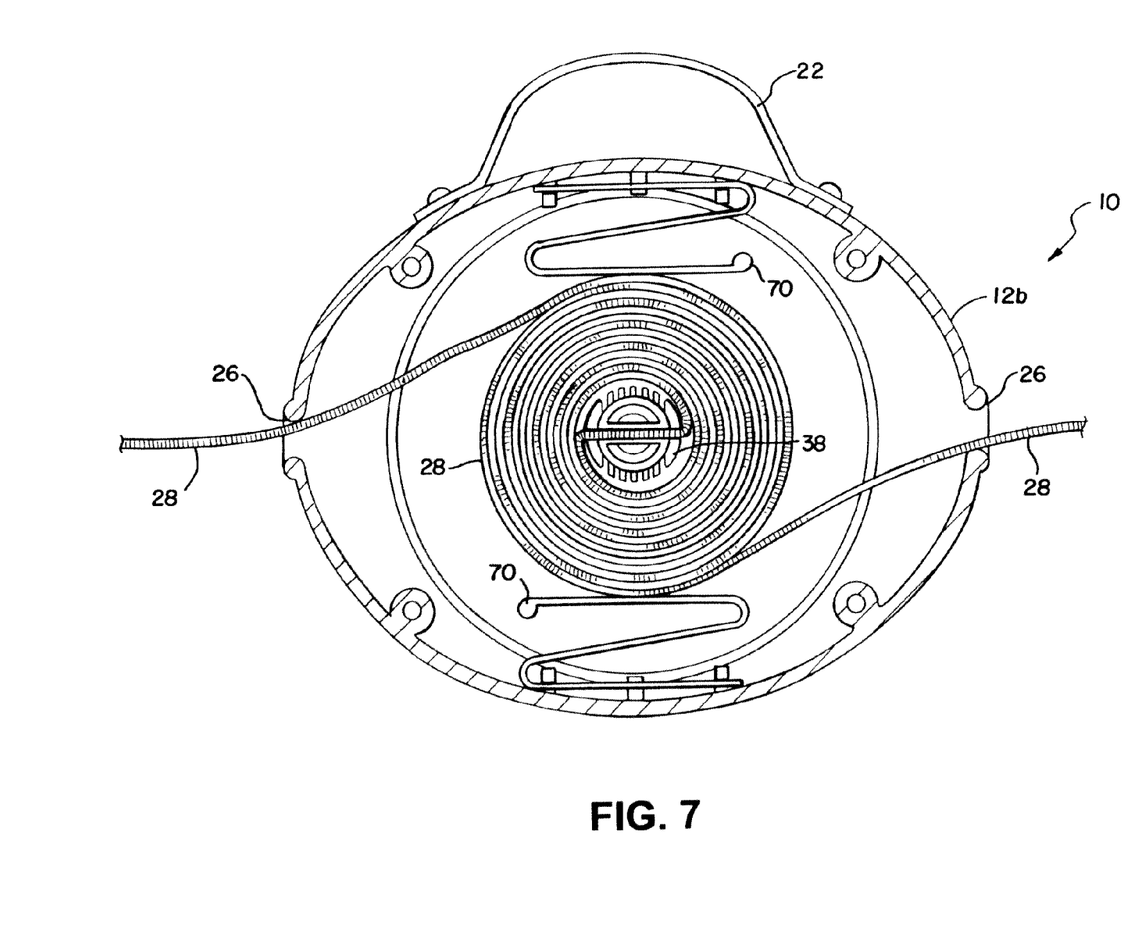
FIG. 7 is a view similar to FIG. 6, but with the tow strap in a retracted position.
Figure 8:
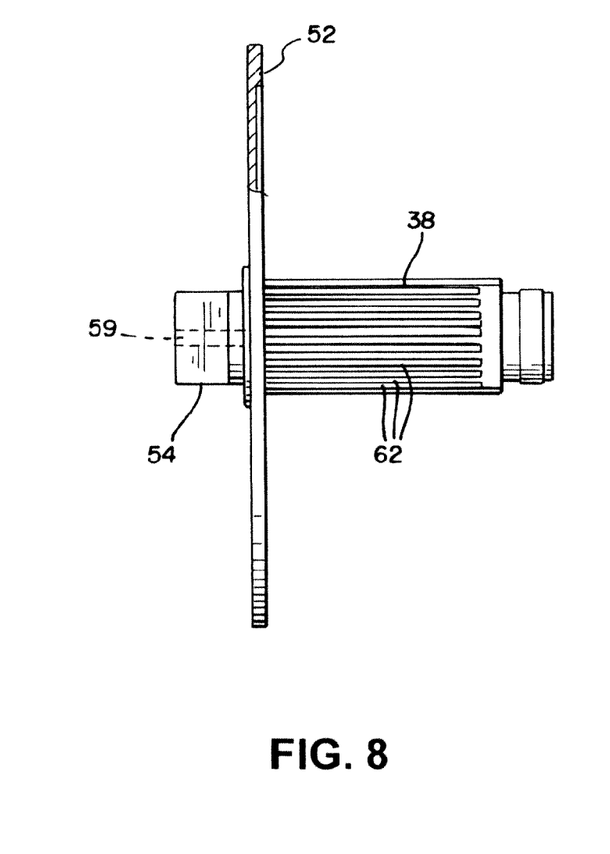
FIG. 8 is a detailed view of a spool used in an embodiment of this disclosure.
Figure 9:
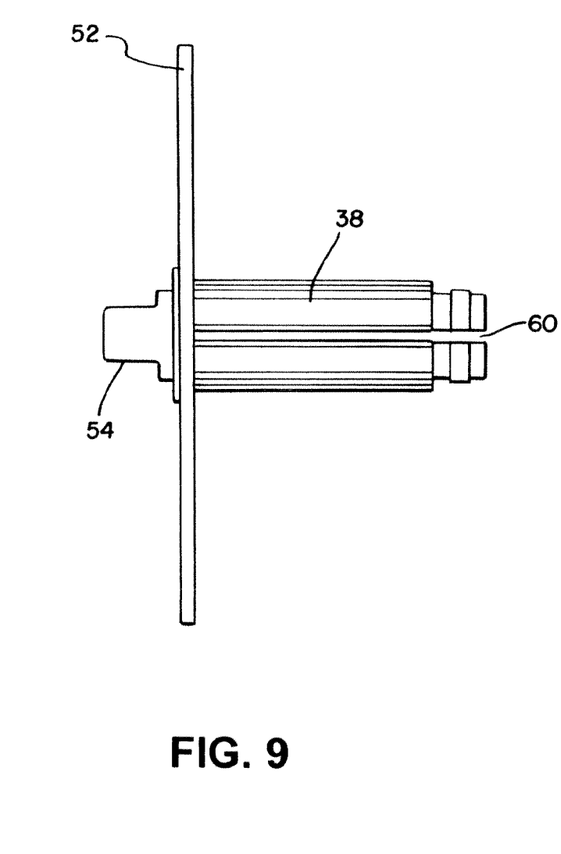
FIG. 9 is a view of the spool shown in FIG. 8, rotated by 90 degrees.
Figure 10:
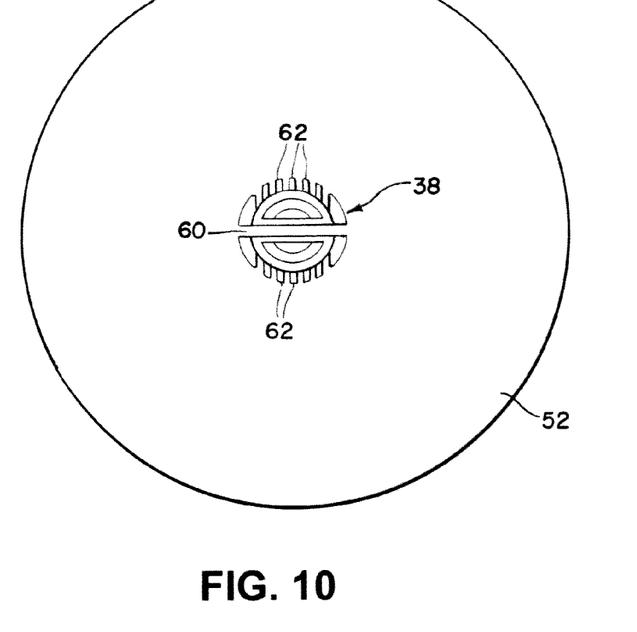
FIG. 10 is a view of the spool shown in FIGS. 8 and 9, taken from the right side of FIGS. 8 and 9.
Figure 11:
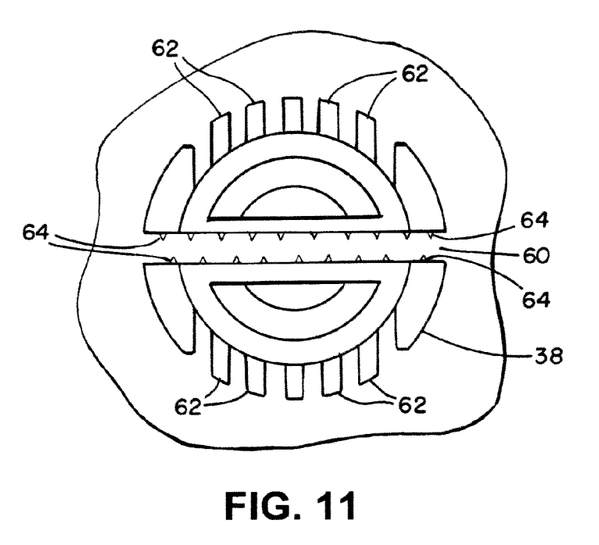
FIG. 11 is an enlarged detailed view of the spool shown in FIG. 10.

Referring to FIGS. 5-7, a pair of Z-shaped biasing springs 70 is mounted in the interior of the housing 12, one at the top of the housing, and one at the bottom. As best shown in FIG. 6, each of the springs 70 is formed from a strip of spring metal that is bent into a Z-shape, with a first horizontal segment 72 secured to the interior of the housing 12 by means such as mounting tabs 74, advantageously formed as part of the housing, and a second horizontal segment 76 connected to and spaced from, the first horizontal segment 72 by a diagonal connecting segment 78. The springs 70 have an uncompressed or unbiased state (FIG. 6) when the strap 28 is unwound from the spool 38 to its fully extended condition (i.e., the spool 38 is empty), and a fully compressed (fully biased) state (FIG. 7) when the strap 28 is fully wound onto the spool 38 in the retracted position of the strap 28 (i.e., the spool 38 is full).

In the uncompressed state of the springs 70, the second horizontal segment 76 of each spring 70 seats against the empty spool 38. As the spool 38 is rotated, as described below, to retrieve the strap 28 from its extended state onto the spool 38, the coiling of the strap 28 onto the spool 38 urges the second horizontal segment 76 toward the first horizontal segment 72 of each spring 70, thereby placing the springs 70 in compression. This compression of the springs 70 creates a frictional braking or biasing force to the portion of the strap 28 that is coiled on the spool 38, thereby applying a slight tensioning to the strap 28 as it is paid out from the spool 38. This tensioning substantially limits any inadvertent or undesired unwinding of the strap 28 from the spool 38 due to the weight of the towing hooks 44, while also minimizing backlash and tangling that could result from excessively rapid recovery of the strap 28 onto the spool 38. Optionally, a friction-enhancing material or surface treatment (not shown) may be provided on the surfaces of the second horizontal spring segments 76 that engage the strap 28 to increase the amount of braking force applied by the springs 70.

FIGS. 1, 2, 3, and 7 show the tow, strap 28 in its fully retracted position, in which, as best shown in FIG. 7, the strap 28 is fully coiled or wound onto the spool 38. The strap 28 may be unwound from the spool 38 by attaching one of the tow hooks 44 to a stationary structure (such as a vehicle to be towed) and attaching the other tow hook 44 to a driven vehicle that is moved away from the stationary structure. Alternatively, a pulling force can be applied to one or both of ends of the strap 28 and/or the tow hooks 44. The crank 32 may also be turned in the first rotational direction, thereby rotating the spool 38 in the same direction to unwind the strap 28 from the spool 38 under the weight of the tow hooks 44. As mentioned above, the springs 70 maintain a frictional braking force against the strap 28 as it unwinds to minimize slack in the strap 28, thereby greatly reducing the possibility of tangles of the strap within the housing 12. When the tow strap 28 is in its fully extended position or state, as shown in FIG. 6, the strap 28 extends approximately equidistantly from both side of the house 12, which is thus positioned at approximately the center of the extended strap 28.

When the tow strap 28 is in the fully extended position, the tow strap apparatus 10 is configured to transmit substantially all of a tension force applied by a towing vehicle to a towed vehicle through only the tow strap 28 itself, without any tension forces applied to the structure of the housing 12, and with relatively little tension applied to the spool 38. This advantageous result is largely the result of the geometry of the spool 38, in which the diametric slot 60 permits the unitary strap 28 to pass completely through the spool 38, with the only contact between the strap 28 and the spool 38 being through the gripping protuberances or teeth 64 (which are not configured as substantial load-bearing elements). Thus, when the tow strap 28 is in the fully extended position (FIG. 6), substantially all of the tension force can be transmitted through the tow strap 28 and the tow hooks 44. Thus, because neither the housing 12 nor the spool 38 is a major load-bearing component, they can be made of lighter, less expensive materials.

When the tow hooks 44 are freed from their respective vehicles or the like, the tow strap may be retrieved from its extended position or state (FIG. 6) and returned to its fully retracted position (FIG. 7) by turning the crank 32 in the second direction, which, in turn rotates the spool 38 in the second direction. The strap 28 is then withdrawn into the housing 12 through the housing apertures or slots 26 and re-wound onto the spool 38. The longitudinal ridges 62 on the spool 38, as discussed above, enhance the frictional grip between the spool 38 and the strap 28 for the initial windings of the strap 28. As additional windings of the strap 28 are pulled on to the spool 38, the flanges 50, 52 guide the strap 28 so that it remains centered on the spool 38. The springs 70 maintain a frictional braking force against the strap 28, as discussed above, to minimize slack in the strap 28, thereby substantially reducing the possibility of tangles in the strap 28 within the housing 12. As the user continues to turn the crank 32, the strap 28 is progressively wrapped about itself to form a doubly-wound coil. In the fully retracted position (FIG. 7), the tow strap 28 is generally completely wound around the spool 38, although the looped ends 42 of the tow strap 28 will remain outside the housing 12. The force of the springs 70 against the strap 28 within the housing 12 helps keep the strap from inadvertent unwinding when the apparatus 10 is stored.

The disclosure has been described with reference to various example embodiments. Modifications and variations may suggest themselves upon a reading and understanding of this specification. It is intended to include all such modifications and variations insofar as they come within the scope of the appended claims or the equivalents thereof.

What is claimed is:

1. A retractable tow strap apparatus, comprising:
   a housing having including first and second side walls and a peripheral wall between the first and second side walls, the peripheral wall having first and second opposed end areas, each of the end areas including a slot;
   a unitary tow strap extending through the housing and having first and second ends, each of the first and second ends extending through one of the slots, the tow strap being operable between an extended position and a retracted position;
   a spool rotatably mounted in the housing and engaging the tow strap such that (a) the tow strap is unwound from the spool into the extended position when the spool is rotated in a first direction, and (b) the tow strap is wound onto the spool into the retracted position when the spool is rotated in a second direction;
   a manual crank on one of the first and second side walls of the housing and operably connected to the spool so as to rotate the spool in the second direction when the crank is rotated in the second direction;
   a tensioning mechanism in the housing configured to apply a frictional braking force to a portion of the tow strap that is wound on the spool as the tow strap is wound onto the spool and unwound from the spool; and
   a spring mounted in the housing so as to apply the frictional braking force, the spring comprising:
      a first spring portion secured to the housing;
      a second spring portion having a surface that is engageable against the portion of the tow strap that is wound on the spool; and
      a third spring portion connecting the first and second spring portions.

2. The retractable tow strap apparatus of claim 1, wherein the spool comprises:
   a diametric slot through which the tow strap passes; and
   a gripping element in the diametric slot configured to grip a portion of the tow strap that is disposed within the diametric slot.

3. The retractable tow strap apparatus of claim 1, wherein the spool has first and second ends, the apparatus further comprising a circular flange on each of the first and second ends of the spool.

4. The retractable tow strap apparatus of claim 1, wherein the spool has an outer surface configured to provide a frictional grip between the spool and the tow strap.

5. The retractable tow strap apparatus of claim 4, wherein the outer surface of the spool is configured with a plurality of longitudinal ridges spaced around the circumference of the spool.

6. The retractable tow strap apparatus of claim 1, wherein the housing includes a plurality of drainage holes.

7. The retractable tow strap apparatus of claim 1, wherein the manual crank is disposed in a recessed portion on an exterior surface of one of the first and second side walls of the housing.

8. A retractable tow strap apparatus, comprising:
- a housing having first and second side walls and a peripheral wall between the first and second side walls, the peripheral wall having first and second opposed end areas, each of the end areas including a slot;
- a unitary tow strap extending through the housing and having opposed ends extending through each of the slots, the tow strap being operable between an extended position and a retracted position;
- a spool rotatably mounted in the housing and engaging the tow strap such that (a) the tow strap is unwound from the spool into the extended position when the spool is rotated in a first direction, and (b) the tow strap is wound onto the spool into the retracted position when the spool is rotated in a second direction;
- a diametric slot in the spool through which the tow strap passes;
- a gripping element in the diametric slot configured to grip a portion of the tow strap that is disposed within the diametric slot;
- a manual crank on the exterior surface of the housing and operably connected to the spool so as to rotate the spool in the second direction when the crank is rotated in the second direction;
- a tensioning mechanism in the housing configured to apply a frictional braking force to a portion of the tow strap that is wound on the spool as the tow strap is wound onto the spool and unwound from the spool; and
- a spring mounted in the housing so as to apply the frictional braking force, the spring comprising:
  - a first spring portion secured to the housing;
  - a second spring portion having a surface that is engageable against the portion of the tow strap that is wound on the spool; and
  - a third spring portion connecting the first and second spring portions.

9. The retractable tow strap apparatus of claim 8, wherein the spool has a rotational position in which the diametric slot of the spool is aligned with the slots in the housing.

10. The retractable tow strap apparatus of claim 8, wherein the spool has first and second ends, the apparatus further comprising a circular flange on each of the first and second ends of the spool.

11. The retractable tow strap apparatus of claim 8, wherein the spool has an outer surface configured to provide a frictional grip between the spool and the tow strap.

12. The retractable tow strap apparatus of claim 11, wherein the outer surface of the spool is configured with a plurality of longitudinal ridges spaced around the circumference of the spool.

13. The retractable tow strap apparatus of claim 8, wherein the housing includes a plurality of drainage holes.

14. The retractable tow strap apparatus of claim 8, wherein the manual crank is disposed in a recessed portion on an exterior surface of one of the first and second side walls of the housing.

* * * * *